United States Patent [19]

Dika

[11] Patent Number: 4,947,904
[45] Date of Patent: Aug. 14, 1990

[54] APPARATUS FOR STACKING BOLTS

[76] Inventor: Michael Dika, Box 117, Rycroft, Alberta, Canada, T0H 3A0

[21] Appl. No.: 448,918

[22] Filed: Dec. 12, 1989

[51] Int. Cl.⁵ ............................................. B27L 1/00
[52] U.S. Cl. .................................. 144/2 Z; 144/3 D; 144/338; 144/343; 414/501; 414/517
[58] Field of Search ............... 144/2 Z, 3 D, 336, 338, 144/343; 414/501, 511, 517

[56] References Cited

U.S. PATENT DOCUMENTS

| | | | |
|---|---|---|---|
| 3,012,682 | 12/1961 | Williamson | 414/511 |
| 3,398,774 | 8/1968 | Hahn | 144/338 |
| 3,868,982 | 3/1975 | Kurelek et al. | 144/338 |
| 3,882,910 | 5/1975 | Peltola et al. | 144/338 |
| 4,576,540 | 3/1986 | Derain et al. | 414/511 |
| 4,620,578 | 11/1986 | Verrill et al. | 144/343 |

*Primary Examiner*—W. Donald Bray
*Attorney, Agent, or Firm*—E. Peter Johnson

[57] ABSTRACT

The stacker comprises a receiving bin adapted to position bolts close to the ground in an orientation that is perpendicular to the direction of advance of the stacker. The bin has side walls that closely confine the two ends of the bolts. A reciprocating plunger at the base of the bin biases the bolts rearwardly through an aperture into a stacking bin that trails the receiving bin. The stacking bin is open at the rear and at the bottom. Its parallel side walls closely confine the ends of the bolts collecting therein. The bolts biased rearwardly by the plunger are forced into the base of the stack in the stacking bin. The combination of the resistance of the ground-engaging stack, the confinement by the side walls, and the forced introduction of bolts into the base of the stack, induces a "boiling up" action of the bolts at the front end of the stack whereby they self-align themselves into a parallel state. When the bins are moved ahead, they leave behind an elongated stack of bolts.

24 Claims, 10 Drawing Sheets

APPARATUS FOR STACKING BOLTS

FIELD OF THE INVENTION

The present invention relates to apparatus for stacking short logs or bolts in the form of a lineal stack several bolts in height. In another aspect, the invention relates to apparatus for de-limbing a cut tree, cutting it into short logs, and then stacking it as aforesaid.

BACKGROUND OF THE INVENTION

The invention has been developed in connection with processing aspen trees and stacking the produced short logs (called "bolts") in logging operations conducted in Northern Alberta. The conventional steps practiced and the equipment used in that operation will now shortly be described, to identify some of the shortcomings that the present invention solves. However, in so doing it is to be understood that the invention is not to be limited in application to processing aspen.

In connection with such logging, the trees are cut and then skidded to the side of the logging road. Here they are placed with their butt ends at the road edge and their stems extending generally perpendicularly from the road. A machine, referred to as a de-limber, comes along and grasps each tree with two annular sets of arms. The outermost arms have de-limbing knives on their edges and are carried by a telescoping boom. The innermost arms are carried by the machine and are stationary. The outermost arms grasp the tree, part way up its stem, and place the butt into the innermost arms, which firmly grasp the butt. The outermost arms are then partially loosened and are stroked up the tree by the boom. It may require two or more strokes of the boom to de-limb the stem to a pre-determined diameter. The outermost arms are then further closed, to cut off the remaining unscraped tree top. The outermost arms are then moved back partway along the stem, the innermost arms are released and the stem is dropped to the ground.

At this stage, the de-limbed stems may be loaded onto a truck and sent to the mill for further processing. Or alternatively, they may be further processed at the logging site by cutting them into 8 foot long bolts.

The bolt-forming step in the field involves use of a second machine, referred to as a "slasher". The slasher has an arm that picks up the de-limbed stem with a grapple, rotates it through 90° so that it is aligned with the road, and then advances the stem longitudinally until its end contacts a butt plate. A cutting element, spaced 8 feet from the butt plate, then moves into engagement with the stem and cuts it to form a bolt. The bolt drops into a "basket". The advancement and cutting process is then repeated. Once the basket is filled with bolts, the slasher arm is actuated to pick up the logs in the basket, rotate them through 90°, and then place them in piles on the road edge, ready to be loaded on a truck.

From the foregoing, it will be noted that the conventional system involves a significant number of machine movements, such as:

picking up the tree from the skidded tree pile;
two-way travel of the tree stem during delimbing;
laying the de-limbed stem down in a separate pile;
picking up the de-limbed stem with the slasher and rotating it 90° to align it with the slasher; and
positioning the basket load of bolts at the side of the road.

It is a preferred objective of the present invention to provide apparatus and processing steps which simplify the operations of de-limbing and cutting the trees to form bolts and assembling the bolts in a stacked condition amenable for loading onto trucks.

It is the main objective to provide a novel system for stacking bolts.

SUMMARY OF THE INVENTION

In a first aspect of the invention, there is provided a movable apparatus for stacking bolts to form an elongated linear stack. The apparatus, termed a "stacker", is adapted to be moved along a windrow of trees that are in the process of being converted into bolts. The stacker is operative to receive these bolts and stack them in an orientation such that they are transverse to the longitudinal axis of the stack to be created. The formed stack issues from the open rear end of the ongoing stacker and is left on the ground in the form of an elongated, linear stack, one bolt in width and several bolts in height.

The stacker comprises means, such as a receiving bin or hopper, that function to position one or more received bolts adjacent to ground surface in an orientation that is generally perpendicular to the direction of advance of the stacker. Means, such as a plunger, are provided to bias the so-positioned bolts rearwardly, while preserving their orientation. The stacker further comprises means, such as a stacking bin, for collecting the bolts and depositing them on the ground in the form of a stack. Preferably, the stacking bin is open-bottomed (at least at its rear end) and has an open rear end. It comprises a front wall and a pair of spaced, rearwardly extending, parallel side walls. The side walls are spaced apart a distance that is just greater than the length of the bolts, so the walls are operative to confine the bolts at their ends. The front wall has an inlet located adjacent ground surface. The inlet communicates with the hopper and is adapted to enable entry of the bolts, biased by the plunger, into the stacking bin chamber.

The following features of the stacker will be noted:

Except when first beginning, the bolts being biased into the stacking bin encounter a stack of bolts already in the bin chamber. This stack of bolts has frictional contact with the ground surface. Thus, the newly entering bolts encounter resistance and have to be driven with some force into the stack;

The bolts in the stacking bin are closely confined at each of their ends by the side walls of the bin; and The bolts being introduced into the bin are entering at or adjacent to ground surface (or at the base of the stack).

The result of combining these features is that the entry of new bolts into the stack in the bin induces a "boiling up" action of the bolts. The bolts, which otherwise would have a tendency to "jack-straw", self-align themselves in the boiling-up action and form a generally uniform and neat stack of parallel members having each of their ends generally in a common vertical plane.

In a second aspect of the invention, a novel processing assembly is combined with the stacker to yield a novel bolt-forming and stacking assembly. The processing assembly comprises:

A conventional articulated arm and grapple (known as a "knuckle boom log loader"), which is adapted to reach out and grasp one or more of the tree stems by their butt ends and drag them inwardly to position the butt ends over a processing head, at which point the grapple may then be opened to drop the butt ends into engagement with the processing head; and A processing head that is mounted on a pivoting and rotating support, so that the head may align itself with the one or more stems being processed. The head is adapted to engage and longitudinally advance the stem; simultaneously de-limb it; terminate advancement when the proper bolt length extends past a cutting element; and pivot the cutting element through the advanced stem to cut and form the bolts. More particularly, the processing head comprises: a pair of driven rolls that clamp onto the dropped stem and advance it axially; de-limbing means that encircle the advancing stem and scrape off the branches; a cutting element, such as a pivoting chain saw or circular saw, that is adapted to sever the stem; and means for interrupting the advance of the stem when the desired length has passed the saw, whereby the rolls are stopped and the saw is pivoted to cut and form the bolts, which drop into the hopper.

It will be noted that the bolt-forming and stacking assembly is characterized by the following advantages:

The tree stem is handled only once, by advancing it longitudinally;

The stem is de-limbed and cut into bolts in the course of the single longitudinal movement of the stem;

The bolts remain aligned with the travel of the stem, so no re-orientation is involved;

The processing of stems does not involve the grapple arm, so the operator may use the latter to pick up a second set of stems as the first set is being processed; and The stack of bolts issue from the rear end of the stacker as it moves ahead, without any requirement for machine movements (such as lifting and rotating baskets of bolts, as is the case in the prior art).

Broadly stated, the invention is an apparatus for stacking de-limbed logs to form a linear stack, comprising: means for receiving the bolts and positioning them adjacent ground surface in generally perpendicular relation to the longitudinal axis of the stack to be created; means for biasing the bolts rearwardly out of the positioning means while maintaining their orientation; and means for collecting the bolts, as they are biased out of the positioning means, and depositing them on the ground in the form of a stack as aforesaid, said collecting means being positioned contiguously and rearwardly of the positioning means whereby the bolts being biased are forced into the base of the stack being collected, said collecting means being adapted to confine the bolts therein at their ends.

DESCRIPTION OF THE PREFERRED EMBODIMENT

The illustrated bolt-forming and stacking assembly 1 comprises a tractor 2, a grapple arm 3 mounted on the rear end of the tractor, a hopper 4 and stacking bin 5 which are carried by a wheel-supported skid frame 6 that is hitched to the tractor 2, and a processing head 7 carried by the front end of the skid frame 6. These components form a unitary assembly that may be moved along a logging road or the like.

The tractor 2 has a conventional motor and hydraulic system for powering and controlling the components. It is within the ordinary skill of the art to design and provide these systems. Therefore they will not be described herein, as they do not go to the essence of the invention. However, the disclosure does indicate the functions to be carried out and the operational and sequential features that are involved.

As stated, the tractor 2 carries a conventional grapple arm 3. This arm is mounted on a turntable 8, for rotation about a vertical axis. It can also be extended or contracted and raised or lowered, as required. At its outer end, the arm carries a conventional log-loading grapple 9. The arm is equipped with actuating cylinders and control circuits (not shown), whereby the operator may control the arm from the cab 10. The arm may be used to reach outwardly to the edge of the logging road, grasp one or more butt ends of the trees extending therefrom, lift the grasped butt(s), drag the trees inwardly so that the butt ends overlie the processing head 7, and drop the grasped ends so that they engage the processing head 7.

The skid frame 6 is suspended at its front end from the tractor 2 by a pivoting linkage assembly 11. More particularly, links 12 are pivotally connected to each of the tractor and skid frame, to enable the front end of the skid frame to be raised or lowered. A hydraulic cylinder 13 interconnects the tractor hitch 14 with the skid frame and, when actuated, the cylinder is operative to raise or lower the skid frame. At its rear end, the skid frame is pivotally interconnected with the rear wheels 15 by a link assembly 16. A hydraulic cylinder 17 is pivotally connected between the skid frame and link assembly 15 and functions to raise or lower the rear end of the skid frame, as required. A pair of stabilizer legs 18, actuated by cylinders 18a, are mounted to the two sides of the skid frame at its front end, for stabilizing the frame when the apparatus is working. In summary, means are provided for lowering the skid frame 6 to the ground and stabilizing it. The skid frame and stabilizer legs can also be raised, to enable the assembly 1 to move along the road.

Suitable hydraulic circuits (not shown) are provided for controlling the cylinders 13, 17, 18a from the cab 10.

The processing head 7 is mounted on a transverse support beam 19 which, in turn, is mounted on the front end of the skid frame 6 by a gimbal joint 20. The gimbal joint 20 enables the head 7 to rotate in a horizontal plane and to pivot in a vertical plane, within limits dictated by the stops 21. As a result, the head 3 may swivel and pivot as required to align itself with the tree stem being processed.

More particularly, the gimbal joint 20 comprises a turntable 22 mounted on the skid frame 6. The turntable 22 carries a pair of upstanding, spaced apart lugs 23. A wrist pin 24 is supported by the lugs 23 and is free to pivot. The main support beam 19 of the processor head is mounted on the wrist pin 24.

The processing head 7 comprises a linear array of components carried by the support beam 19 and adapted to engage the tree stem being processed, advance it longitudinally, de-limb it as it advances, cut it into de-limbed bolts of pre-determined length, and discard the undesired small diameter end of the stem. These components perform their functions during a single pass or advancement of the stem.

Figure 1:
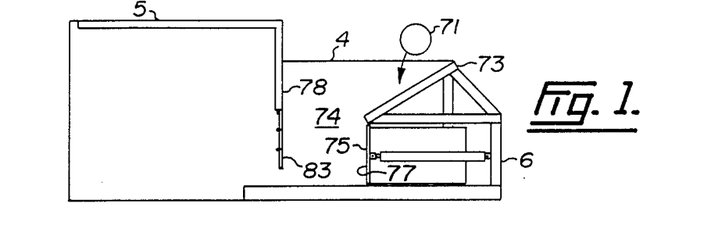
FIGS. 1–7 are schematic side sectional views showing the operation of the stacker.
Figure 2:
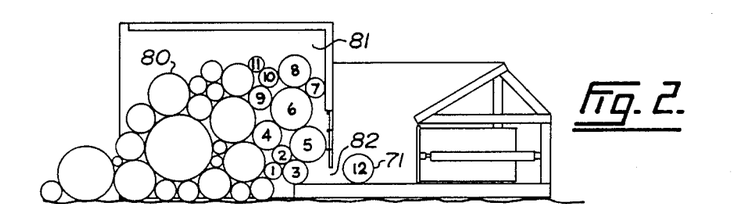
Figure 3:
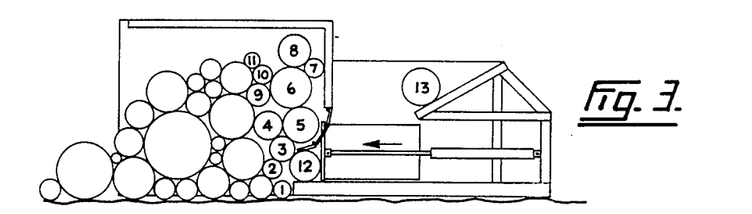
Figure 4:
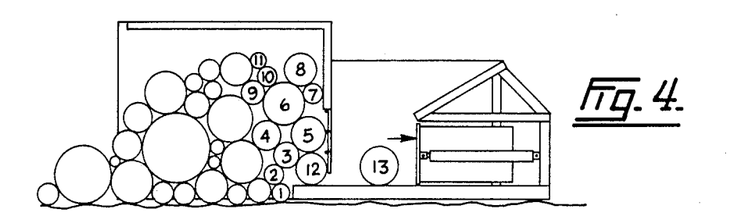
Figure 5:
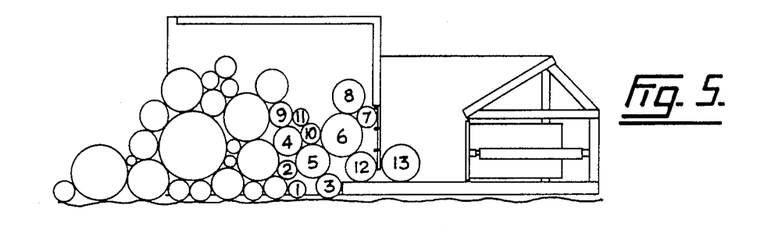
Figure 6:
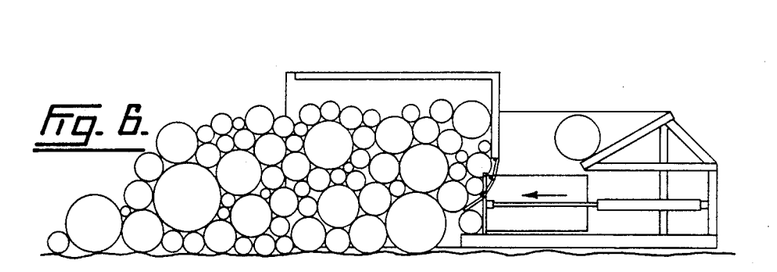
Figure 7:
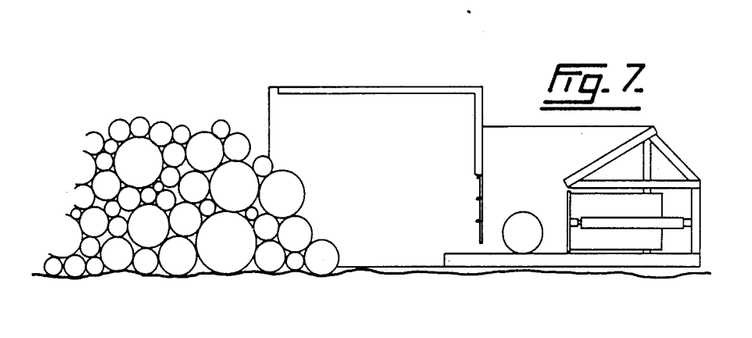
Figure 8:
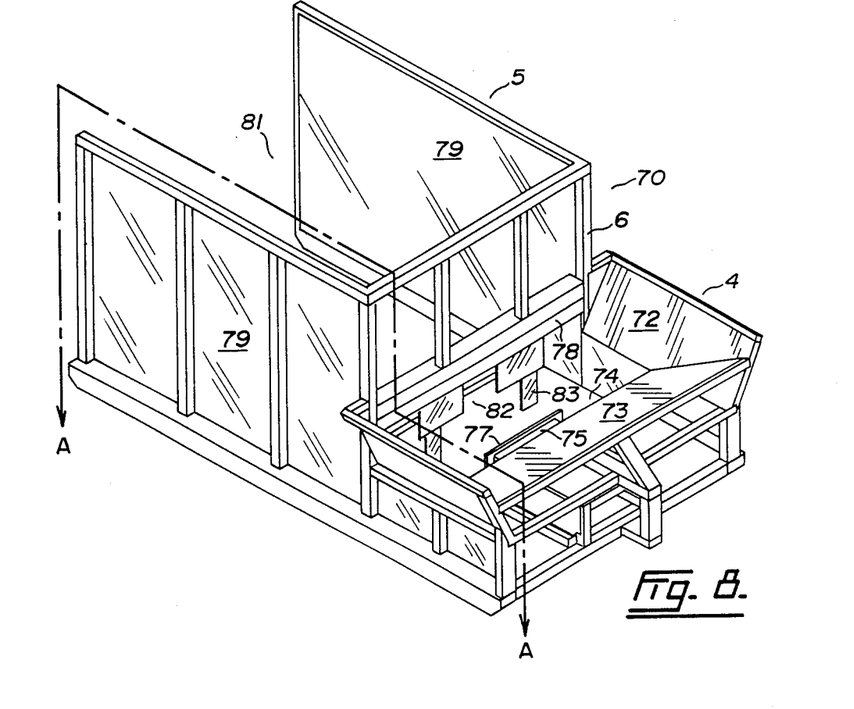
FIG. 8 is a perspective view of the stacker, showing the hopper and stacking bin.
Figure 9:
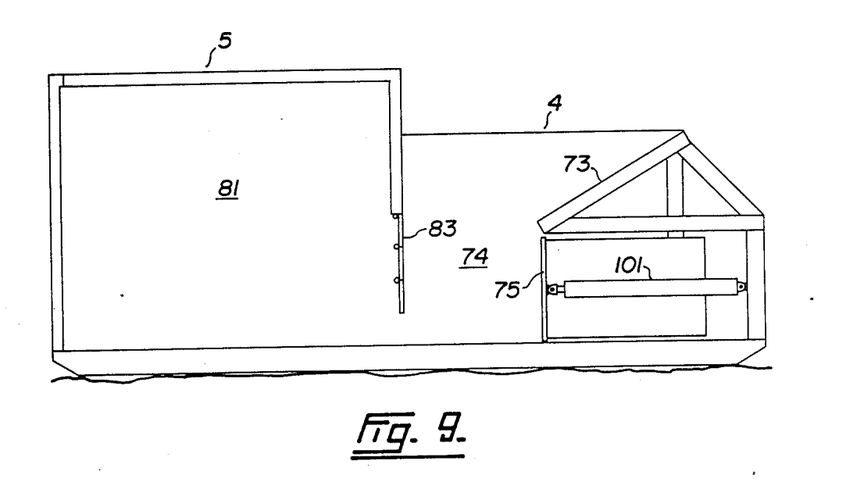
FIG. 9 is a side sectional view of the stacker, taken along the line A—A of FIG. 7.
Figure 10:
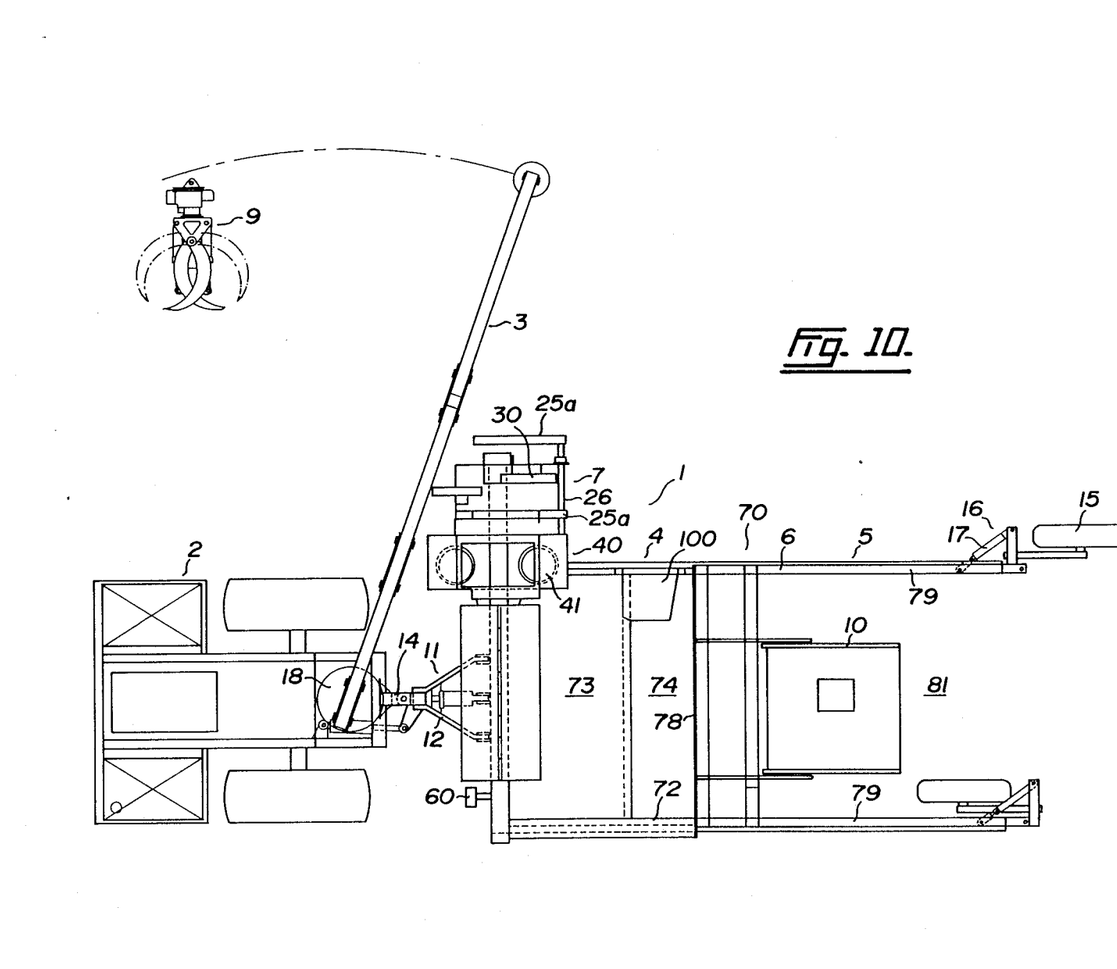
FIG. 10 is a top plan view of the bolt-forming and stacking assembly.
Figure 11:
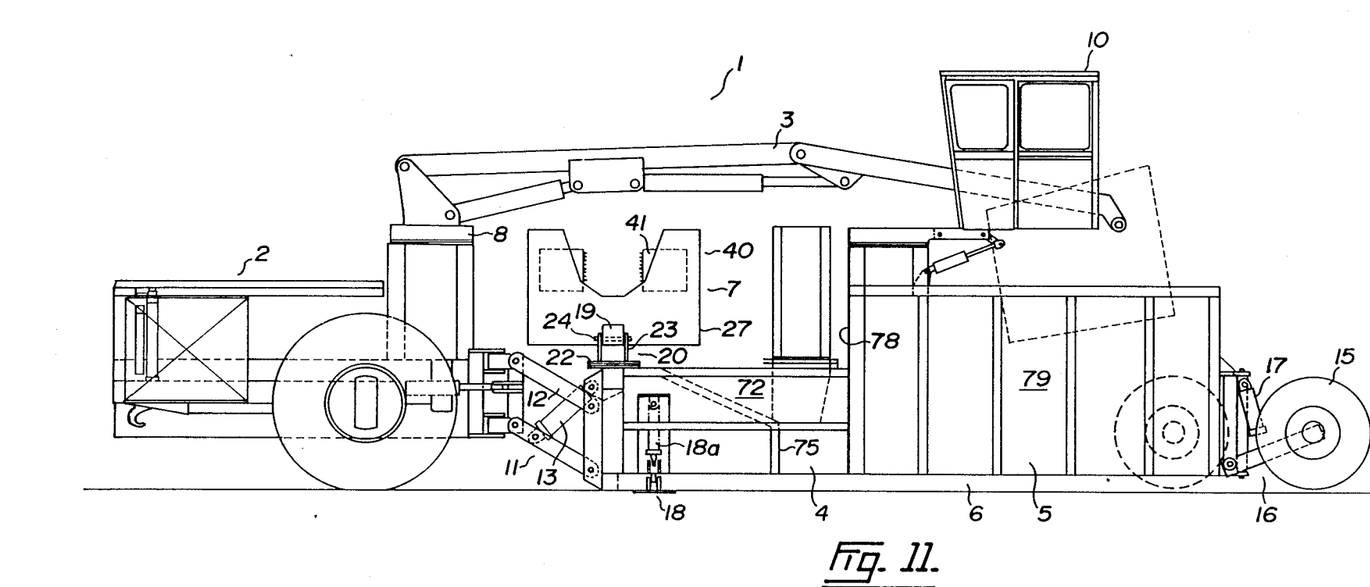
FIG. 11 is a side view of the assembly of FIG. 9.
Figure 12:
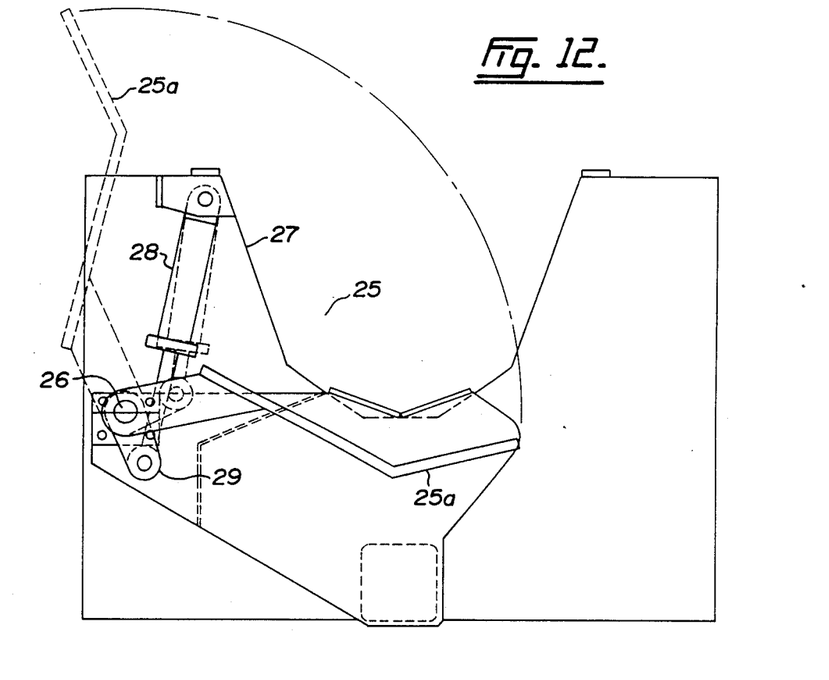
FIG. 12 is an end view showing the kicker assembly.
Figure 13:
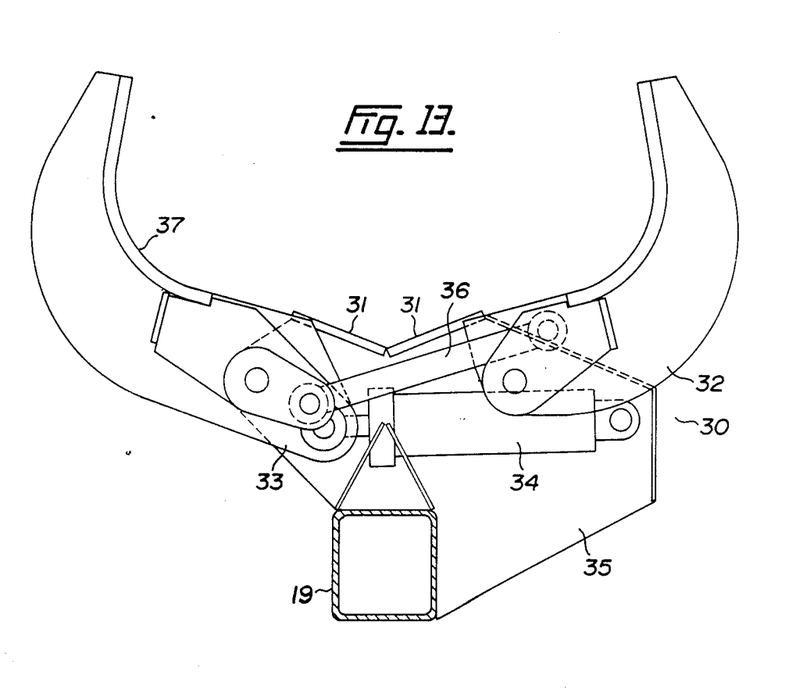
FIG. 13 is an end view showing the de-limbing assembly.
Figure 14:
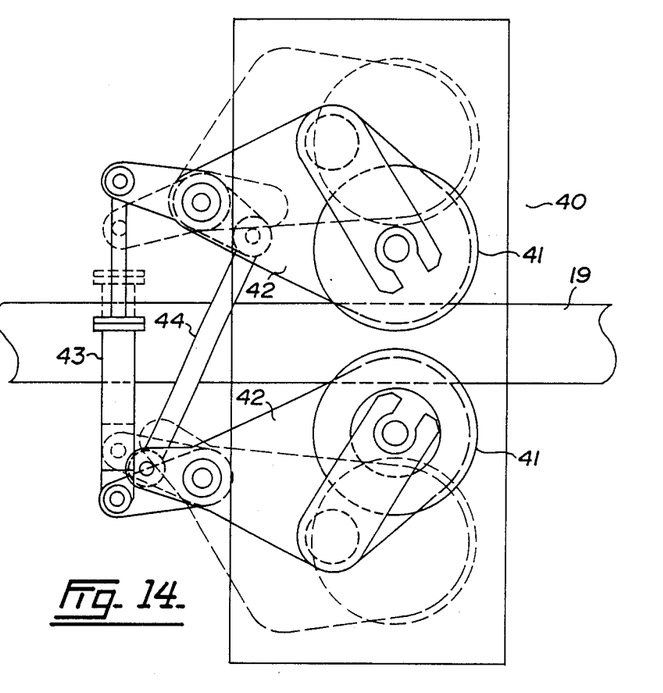
FIG. 14 is a top plan view showing the roll assembly.
Figure 15:
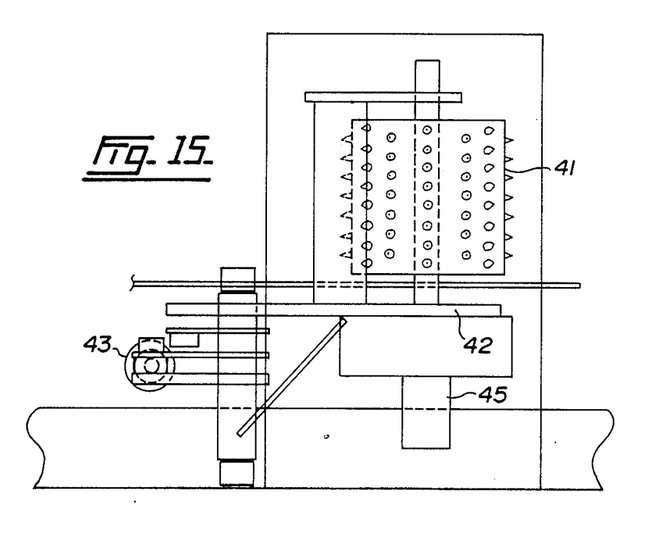
FIG. 15 is a side view showing the roll assembly.
Figure 16:
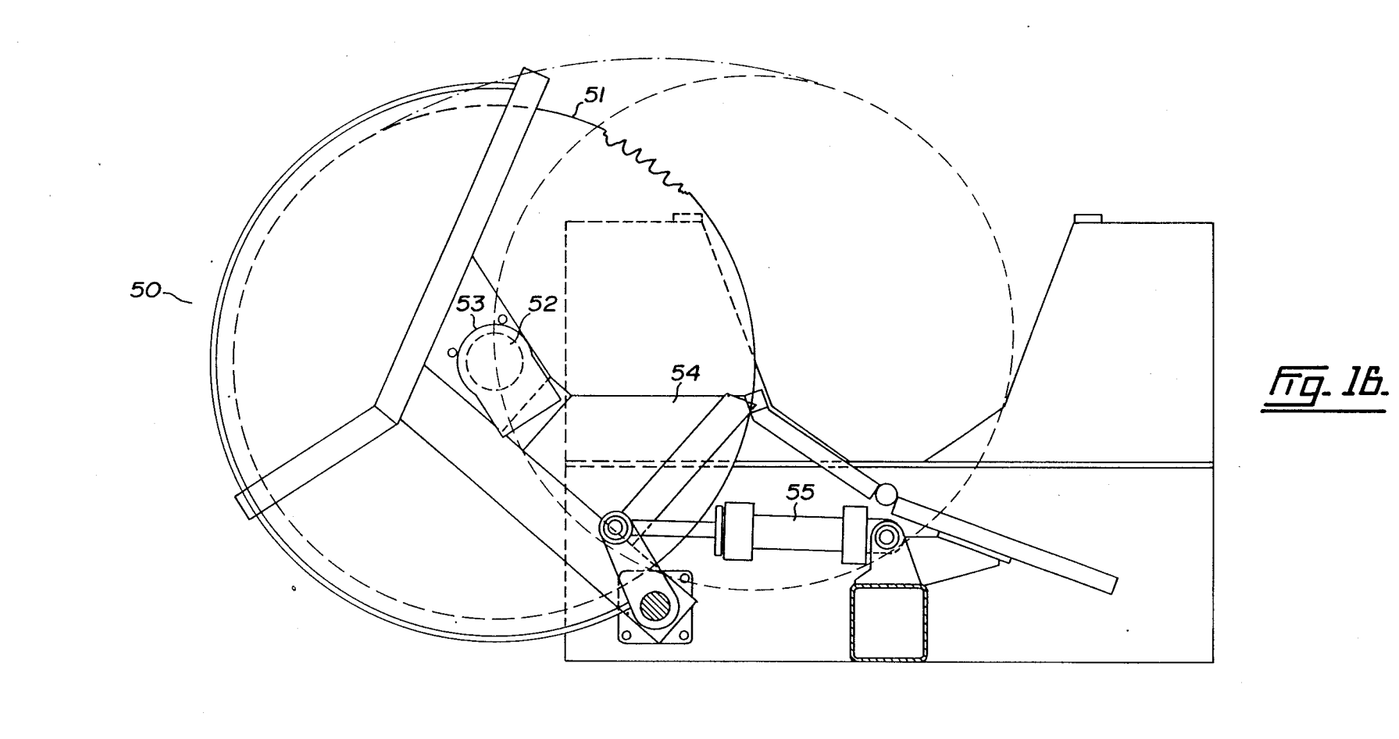
FIG. 16 is an end view showing the cutting assembly.
Figure 17:
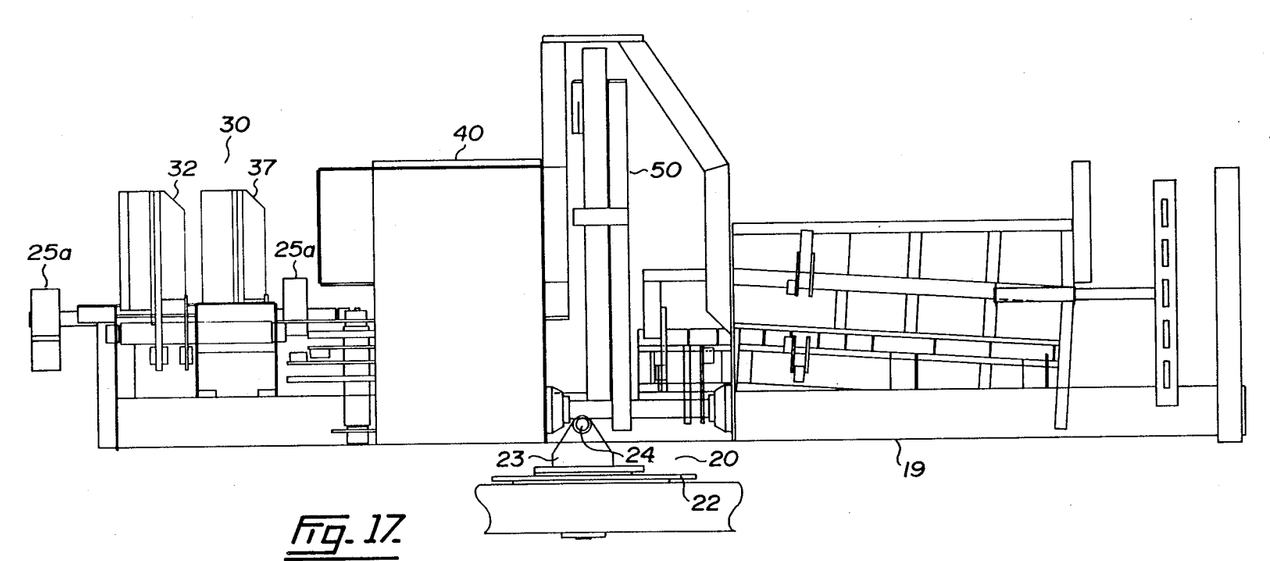
FIG. 17 is a side view showing the processing head.
Figure 18:
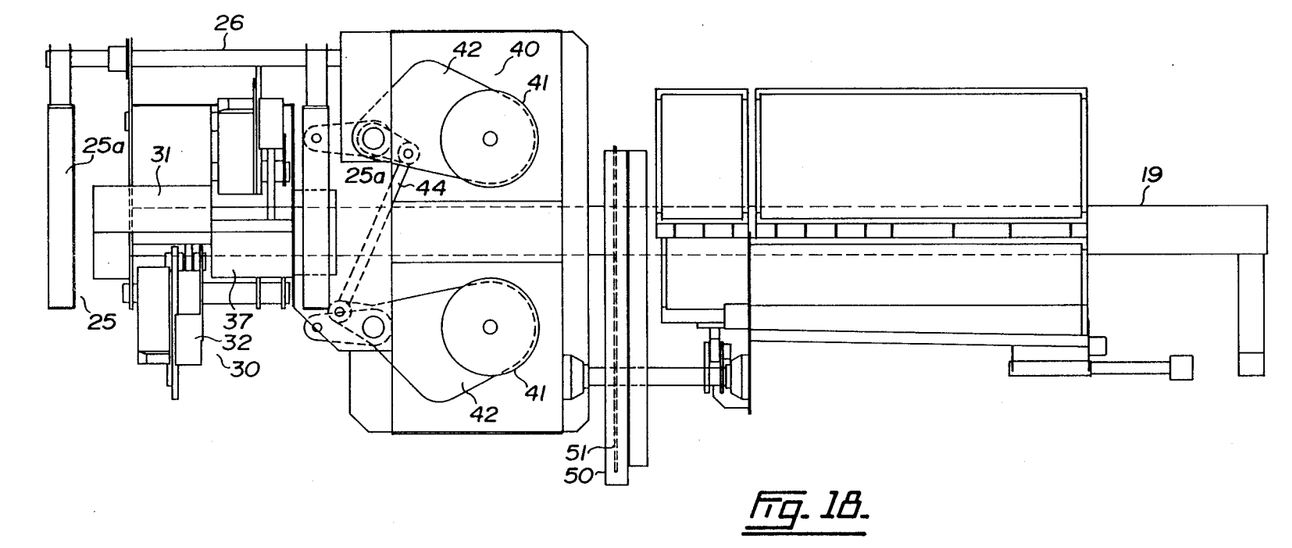
FIG. 18 is a top plan view showing the processing head.

More particularly, at its outermost end, the head 7 comprises a kicker arm assembly 25 adapted to eject the tree top upward and away from the assembly 1. Having reference to FIGS. 16 and 17, the kicker arm assembly 25 includes a pair of kicker arms 25a, which are pivotally mounted on a rotatable pivot shaft 26 carried by a housing 27 secured to the main support beam 19. A hydraulic cylinder 28 is pivotally connected between the housing 27 and a lug 29 connected with the pivot shaft 26. Extension of the cylinder 28 will cause the kicker arms 25 to rotate upwardly about the shaft 26, to throw the tree top away.

The head 7 further has a de-limbing assembly 30 mounted on the main support beam 19. The de-limbing assembly comprises a pair of de-limbing plates 31 having knife edges arranged in the form of a shallow V. The plates 31 support the tree stem from below as it is being advanced. A first upstanding curved de-limbing arm 32, having a knife edge, is pivotally mounted on the rod 33 of a hydraulic cylinder 34, which is pivotally mounted to a plate 35 secured to the main support beam 19. A link 36 is pivotally connected between the first de-limbing arm 32 and a second similar de-limbing arm 37. Extension of the rod 33 will cause the de-limbing arms 32, 37 to move together and rotate into close engagement with the tree stem being processed.

Inwardly of the de-limbing assembly 30, the head 7 has a feed roll assembly 40 mounted on the support beam 19. The feed roll assembly 40 comprises a pair of vertical studded rolls 41, each rotatably mounted in a carrier frame 42. Each carrier frame 42 is pivotally secured to one end of an actuating hydraulic cylinder 43. The two carrier frames 42 are joined by a pivotally mounted equalizer link assembly 44. Extension and contraction of the roll cylinder 43, coupled with the action of the equalizer link assembly 44 and the pivot connections involved, will cause the two rolls 41 to open and close proportionately and equally. A drive motor 45 powers each roll 41.

Inwardly of the feed roll assembly 40, the processor head 3 comprises a cutting assembly 50 which can be actuated to cut through the tree stem being processed. The cutting assembly 50 shown comprises a circular saw 51 mounted on and driven by the shaft 52 of a hydraulic motor 53. The motor 53 and saw 51 are mounted on a pivoting arm 54 supported by the main support beam 19. A hydraulic cylinder 55 is pivotally connected between the support beam 19 and arm 54, for swinging the saw 51 into cutting engagement with the tree stem.

A photo cell assembly 60 is provided to sense the innermost end of the advancing stem. The photo cell assembly 60 is connected with means (not shown) operative to actuate the cutting assembly 50 and temporarily stop the rolls 41.

Suitable hydraulic circuits (not shown) are provided for actuating the kicker arm assembly 25, de-limbing assembly 30 and roll assembly 40 from the cab 10.

Turning now to the stacker 70, it comprises a hopper 4 and stacking bin 5.

The hopper 4 is generally rectangular and open-topped. It is positioned below and contiguous to the processing head 7, so that the bolts 71 drop into it as they are cut. The side walls 72 of the hopper are spaced apart so that the bolts 71 are loosely confined at their ends. Typically, the spacing of the side walls can be 9 feet for 8 foot long bolts. The upper ends of the hopper front and side walls 73, 72 are inwardly sloping so that they are adapted to centralize the bolt in the hopper chamber 74. The hopper is reinforced and contained by the skid frame 6. A reject bucket 100 is pivotally mounted to one of the side walls 72. The bucket 100 can be rotated inwardly by a hydraulically actuated cylinder (not shown) to a position at the base of the inwardly sloping front wall 73 of the hopper. There it can intercept a deformed or otherwise defective bolt and throw it away from assembly 1.

In operation, the hopper 4 is adapted to receive and position the bolts 71 adjacent the ground surface on which the skid frame 6 rests. When so positioned, the bolts are oriented generally perpendicularly to the longitudinal axis of the stack that is to be formed.

A broad-faced plunger 75 is centrally positioned at the base of the hopper chamber 74. The plunger 75 is actuated by the rod end of a hydraulic cylinder 101.

In operation, the plunger 75 functions to bias rearwardly any bolts 71 present in the hopper chamber 74. The confining hopper side walls 72 and the broad face 77 of the plunger 75 cooperate to maintain the orientation of the bolts.

The stacking bin 5 is contiguous to and rearward of the hopper 4. They share a common wall 78. The stacking bin 5 is also rectangular in configuration, having parallel side walls 79. The side walls 79 are spaced apart sufficiently so that they loosely confine the bolts 71. The bin 5 is open-ended at the rear and open-bottomed. (Note that, while the drawings show the stacking bin 5 open throughout its height at the rear and open-bottomed throughout most of its length, it is only necessary that the stack 80 formed in the chamber 81 of the stacking bin 5 be able to pass out the rear of the bin and make contact with the ground as it leaves. So the bin can have a floor along most of its length and a rear end wall extending part way down from its upper edge.)

The front wall 78 of the stacking bin 5 forms an aperture 82 at its lower end. The aperture 82 extends the width of the stacking bin 5, so that it is adapted to enable entry therethrough of the bolts being biased rearwardly. A hinged, segmented, one-way closure 83 permits the bolts to move from the hopper chamber 74 into the stacking bin chamber 81, but prevents them returning in the other direction.

From the foregoing, it will be noted that the stacking bin 5 is adapted to collect the bolts being biased rearwardly and to form them into a stack 80, at least the rear part of which is in frictional engagement with the ground surface. When the stacking bin 5 is moved ahead, the stack 80 is left deposited on the ground and joins other bolts already deposited there to form an elongated lineal stack.

In the operation of the assembly, the grapple arm 3 grasps a tree stem and drops its butt end into the gap between the drive rolls 40. The de-limbing assembly 30 is activated to bring the knife arms 32, 37 and knife plates 31 into pressing engagement with the stem. The rolls 40 are also clamped onto the stem and then activated to advance the stem end toward the photo cell assembly 60. When the assembly 60 senses that the stem has reached it, the drive rolls 40 are stopped and the cutting assembly 50 is activated to cut through the stem and form a bolt 71. Some deformed bolts are discarded by the reject bucket 100. The remaining bolts drop into the hopper chamber 74 and are guided to assume a position, at the base of the chamber 74, in which they are generally perpendicular to the longitudinal axis of the stack 80 to be formed. The plunger 75 then is activated to bias the bolts rearwardly out of the hopper 5 and force them into the base of the stack 80 already in the bin chamber 81. The bolts so biased cause a "boiling up" of bolts within the bin chamber 81. The combination of confining the bolts at their ends, providing resistance to their entry into the stack by having it in frictional contact with the ground, and injecting the bolts into the base of the stack, induces a boiling up of the bolts, at the front end of the stack, that causes them to maintain a parallel alignment. Returning to the stem being processed, when the small diameter top end is reached, the kicker arm assembly 25 is activated to discard it.

The scope of the invention is set forth in the claims now following.

The embodiments of the invention in which an exclusive property or privilege is claimed are defined as follows:

1. Apparatus for stacking de-limbed logs to form a linear stack, comprising:
   means for receiving the bolts and positioning them adjacent ground surface in generally perpendicular relation to the longitudinal axis of the stack to be created;
   means for biasing the bolts rearwardly out of the positioning means while maintaining their orientation; and
   means for collecting the bolts, as they are biased out of the positioning means, and depositing them on the ground in the form of a stack as aforesaid, said collecting means being positioned contiguously and rearwardly of the receiving means whereby the bolts being biased are forced into the base of the stack being collected, said collecting means being adapted to confine the bolts therein at their ends.

2. Apparatus for stacking de-limbed bolts to form a linear stack, comprising:
   means for receiving the bolts and positioning them adjacent ground surface in generally perpendicular relation to the longitudinal axis of the stack being created;
   means for biasing the bolts rearwardly out of the positioning means while maintaining their orientation; and
   an open-bottomed bin having a front wall and parallel, rearwardly extending side walls terminating to form an open rear end, said bin being positioned contiguously and rearwardly of the receiving means, said front wall having an aperture adapted to enable entry therethrough of the biased bolts into the bin chamber, whereby the bolts being biased are forced into the base of the stack collecting in the bin, said side walls being spaced so as to confine each bolt at its ends.

3. The apparatus as set forth in claim 1 comprising:
   means, associated with the receiving means, for intercepting and discarding defective bolts as they enter the receiving means.

4. The apparatus as set forth in claim 2 comprising:
   means, associated with the receiving means, for intercepting and discarding defective bolts as they enter the receiving means.

5. The apparatus as set forth in claim 2 comprising:
   means, associated with the bin front wall, for enabling entry of bolts into the bin through the aperture and preventing return of bolts through the aperture.

6. The apparatus as set forth in claim 2 comprising:
   means, associated with the receiving means, for intercepting and discarding defective bolts as they enter the receiving means; and
   means, associated with the bin front wall, for enabling entry of bolts into the bin through the aperture and preventing return of bolts through the aperture.

7. The apparatus as set forth in claim 1 wherein:
   the means for biasing comprises a hydraulically powered plunger.

8. The apparatus as set forth in claim 2 wherein:
   the means for biasing comprises a hydraulically powered plunger.

9. The apparatus as set forth in claim 1 comprising:
   means, associated with the receiving means, for intercepting and discarding defective bolts as they enter the receiving means; and
   the means for biasing comprises a hydraulically powered plunger.

10. The apparatus as set forth in claim 2 comprising:
    means, associated with the receiving means, for intercepting and discarding defective bolts as they enter the receiving means; and
    the means for biasing comprises a hydraulically powered plunger.

11. The apparatus as set forth in claim 2 comprising:
    means, associated with the bin front wall, for enabling entry of bolts into the bin through the aperture and preventing return of bolts through the aperture;
    means, associated with the receiving means, for intercepting and discarding defective bolts as they enter the receiving means; and
    the means for biasing comprises a hydraulically powered plunger.

12. A bolt forming and stacking assembly for processing cut trees to form an elongated, linear stack of bolts, said trees lieing with their axes generally perpendicular to the longitudinal axis of the stack to be created, comprising:
    means for grasping the butt end of a tree and advancing the stem longitudinally;
    means for de-limbing and cutting the advancing stem to form bolts of substantially equal length;
    means for receiving the de-limbed bolts, as they are produced, and positioning them adjacent ground surface in generally perpendicular relation to the longitudinal axis of the stack being created;
    means for biasing the bolts rearwardly out of the positioning means while maintaining their orientation; and
    means for collecting the bolts, as they are biased out of the positioning means, and depositing them on the ground in the form of a stack as aforesaid, said collecting means being positioned contiguously and rearwardly of the receiving means whereby the bolts being biased are forced into the base of the stack being collected, said collecting means being adapted to confine the bolts therein at their ends.

13. A bolt forming and stacking assembly for processing cut trees to form an elongated, linear stack of bolts, said trees lieing with their axes generally perpendicular to the longitudinal axis of the stack to be created, comprising:

means for grasping the butt end of a tree and advancing the stem longitudinally;

means for de-limbing and cutting the advancing stem to form bolts of substantially equal length;

means for receiving the bolts and positioning them adjacent ground surface in generally perpendicular relation to the longitudinal axis of the stack being created;

means for biasing the bolts rearwardly out of the positioning means while maintaining their orientation; and an open-bottomed bin having a front wall and parallel, rearwardly extending side walls terminating to form an open rear end, said bin being positioned contiguously and rearwardly of the receiving means, said front wall having an aperture adapted to enable entry therethrough of the biased bolts into the bin chamber, whereby the bolts being biased are forced into the base of the stack collecting in the bin, said side walls being spaced so as to confine each bolt at its ends.

14. The apparatus as set forth in claim 12 comprising; means, associated with the receiving means, for intercepting and discarding defective bolts as they enter the receiving means.

15. The apparatus as set forth in claim 13 comprising; means, associated with the receiving means, for intercepting and discarding defective bolts as they enter the receiving means.

16. The apparatus as set forth in claim 13 comprising: means, associated with the bin front wall, for enabling entry of bolts into the bin through the aperture and preventing return of bolts through the aperture.

17. The apparatus as set forth in claim 13 comprising: means, associated with the receiving means, for intercepting and discarding defective bolts as they enter the receiving means; and
means, associated with the bin front wall, for enabling entry of bolts into the bin through the aperture and preventing return of bolts through the aperture.

18. The apparatus as set forth in claims 12 wherein: the means for biasing comprises a hydraulically powered plunger.

19. The apparatus as set forth in claims 13 wherein: the means for biasing comprises a hydraulically powered plunger.

20. The apparatus as set forth in claims 12 comprising: means, associated with the receiving means, for intercepting and discarding defective bolts as they enter the receiving means; and
the means for biasing comprises a hydraulically powered plunger.

21. The apparatus as set forth in claims 13 comprising: means, associated with the receiving means, for intercepting and discarding defective bolts as they enter the receiving means; and
the means for biasing comprises a hydraulically powered plunger.

22. The apparatus as set forth in claim 13 comprising: means, associated with the bin front wall, for enabling entry of bolts into the bin through the aperture and preventing return of bolts through the aperture;
means, associated with the receiving means, for intercepting and discarding defective bolts as they enter the receiving means; and
the means for biasing comprises a hydraulically powered plunger.

23. A bolt forming and stacking assembly for processing cut trees to form an elongated, linear stack of bolts, said trees lieing with their axes generally perpendicular to the longitudinal axis of the stack to be created, comprising:

means for grasping the butt end of a tree and advancing the stem longitudinally;

means for de-limbing and cutting the advancing stem to form bolts of substantially equal length;

an open-top bin for receiving the bolts and positioning them adjacent ground surface in generally perpendicular relation to the longitudinal axis of the stack being created;

a plunger, positioned at the base of the receiving bin, for biasing the bolts rearwardly out of the bin, while maintaining their orientation; and an open-bottomed stacking bin having a front wall forming the rear wall of the hopper, said stacking bin having parallel, rearwardly extending side walls terminating to form an open rear end, said common wall having an aperture adapted to enable entry therethrough of the biased bolts into the stacking bin chamber, whereby the bolts being biased are forced into the base of the stack collecting in the stacking bin, said side walls being spaced so as to confine each bolt at its ends;

said receiving bin having means at its upper end for intercepting and discarding defective bolts as they enter the hopper.

24. The apparatus as set forth in claim 23 comprising: means, associated with the stacking bin front wall, for enabling entry of bolts into the bin through the aperture and preventing return of bolts through the aperture.

* * * * *